(12) United States Patent
Nelson et al.

(10) Patent No.: US 7,114,649 B2
(45) Date of Patent: Oct. 3, 2006

(54) AUTOMATIC GENERATION OF BANK DEPOSITS

(75) Inventors: Kimberly Nelson, Fargo, ND (US); Michael Moberg, West Fargo, ND (US); Nancy Egeberg, Argusville, ND (US); Scott McIntyre, Moorhead, MN (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/063,053

(22) Filed: Feb. 22, 2005

(65) Prior Publication Data

US 2006/0186192 A1 Aug. 24, 2006

(51) Int. Cl.
*G06F 17/60* (2006.01)

(52) U.S. Cl. .......................... 235/379; 235/380; 705/30

(58) Field of Classification Search ................ 235/375, 235/379, 380–382, 487; 705/39–44, 28, 705/30
See application file for complete search history.

(56) References Cited

U.S. PATENT DOCUMENTS

| | | | | |
|---|---|---|---|---|
| 5,371,680 A | * | 12/1994 | Anno et al. .................... 705/30 |
| 5,943,655 A | * | 8/1999 | Jacobson ....................... 705/30 |
| 6,038,666 A | * | 3/2000 | Hsu et al. ..................... 713/186 |
| 6,058,375 A | * | 5/2000 | Park ............................ 705/30 |
| 6,164,529 A | * | 12/2000 | Peters et al. ................. 235/379 |
| 6,661,910 B1 | * | 12/2003 | Jones et al. .................. 382/135 |
| 2002/0077971 A1 | * | 6/2002 | Allred .......................... 705/39 |
| 2002/0152142 A1 | * | 10/2002 | Schellmann et al. .......... 705/30 |
| 2003/0080185 A1 | * | 5/2003 | Werther ....................... 235/380 |
| 2003/0200172 A1 | * | 10/2003 | Randle et al. ................ 705/39 |
| 2004/0236651 A1 | * | 11/2004 | Emde et al. ................... 705/34 |
| 2005/0071283 A1 | * | 3/2005 | Randle et al. ................ 705/75 |
| 2005/0098623 A1 | * | 5/2005 | Kim ............................ 235/380 |
| 2005/0149484 A1 | * | 7/2005 | Fox et al. ...................... 707/1 |

\* cited by examiner

*Primary Examiner*—Jared J. Fureman
*Assistant Examiner*—Edwyn Labaze
(74) *Attorney, Agent, or Firm*—Westman, Champlin & Kelly

(57) ABSTRACT

An accounting system has a data file and a bank deposit generator. The data file contains a plurality of financial transactions. Each financial transaction includes associated information. The bank deposit generator is adapted to identify one or more cash-in transactions of the plurality of transactions according to selectable criteria and to associate the one or more cash-in transactions to a bank deposit transaction based on a correlation between the associated information and the selectable criteria.

20 Claims, 6 Drawing Sheets

| 402 | 404 | 406 | 408 | 410 | 412 | 414 | 416 |
|---|---|---|---|---|---|---|---|
| RECEIPT NUMBER | BANK ACCT. | CURR. | PAYMENT METHOD | RECEIPT STATUS | USER ID | DATE | AMT. |
| 003642 | BANK_1 | USD | CHECK | POSTED | ARNIE | 10/8/2004 | 64.33 |
| 003643 | BANK_1 | USD | WIRE | RELEASED | ARNIE | 10/3/2004 | 1042.99 |
| 003644 | BANK_1 | EURO | WIRE | POSTED | ARNIE | 10/15/2004 | 500.00 |
| 015309 | BANK_2 | USD | CHECK | POSTED | PHYLLIS | 10/15/2004 | 1533.67 |
| 015310 | BANK_2 | USD | CHECK | DRAFT | ARNIE | 10/20/2004 | 75.20 |
| 015311 | BANK_2 | CAD | EFT | RELEASED | ARNIE | 10/19/2004 | 120.00 |
| 015312 | BANK_2 | USD | EFT | POSTED | ARNIE | 10/18/2004 | 36.75 |

FIG. 4

AUTOMATIC GENERATION OF BANK DEPOSITS

BACKGROUND OF THE INVENTION

This disclosure relates to computer-based accounting systems, and more particularly, to systems and methods for automated generation of bank deposits in conjunction with cash-in transaction information.

Traditionally, deposits of cash-in transactions in a bank begin with a receipt of monies (e.g., cash, check, and the like). The monies are then tallied and taken, for example, to a bank for deposit. A deposit ticket for depositing the received monies in the bank is prepared, and the monies are deposited in the bank with the deposit ticket.

Often, checkout registers at stores, for example, are linked electronically to a computerized accounting system. Each sale can be posted to the accounts receivable sub-ledger of the accounting system, automatically.

Ultimately, to balance the accounting books, the deposit tickets have to be matched with monies received, which means that each deposit ticket should be associated with transaction lines within the accounts receivable sub-ledger. However, a single bank deposit often reflects monies received from a plurality of cash-in transactions (a plurality of transaction lines), making it difficult to readily identify specific cash-in transactions that are part of any given deposit. As used herein, the term "cash-in transaction" refers to any transaction through which payment is received, including, for example, cash, check, money order, wire transaction, prepaid cards, and the like.

In some existing enterprise accounting systems, a user can create a bank deposit and pick which cash-in transactions belong to the created bank deposit. In other systems, the user can assign individual cash-in transactions to an existing bank deposit. Generally, existing enterprise accounting systems provide the ability to total the bank deposit and to print it, which is a vast improvement over manually listing each cash and check amount. Nevertheless, the process of assigning cash-in transactions to bank deposits is time-consuming and can be difficult, depending on the number of cash-in transactions and deposits.

There is an ongoing need for accounting systems that simplify the process of assigning cash-in transactions to bank deposits within the enterprise system.

SUMMARY OF THE INVENTION

An accounting system has a data file and a bank deposit generator. The data file contains a plurality of financial transactions. Each financial transaction includes associated information. The bank deposit generator is adapted to identify one or more cash-in transactions of the plurality of transactions according to selectable criteria and to associate the one or more cash-in transactions to a bank deposit transaction based on a correlation between the associated information and the selectable criteria.

In one embodiment, a method for generating a bank deposit in an accounting system is provided. Cash-in transactions within a financial transactions data file are identified based on one or more selectable criteria. The identified cash-in transactions are associated to a deposit record. Each of the associated cash-in transactions is updated in the financial transactions data file with a deposit identifier associated with the deposit record.

In another embodiment, an enterprise accounting system has a data file and a bank deposit generator. The data file contains financial transactions and associated information. The bank deposit generator is adapted to assign cash-in transactions of the financial transactions to a bank deposit based on a correlation between the associated information and selectable criteria.

BRIEF DESCRIPTION OF THE DRAWINGS

FIG. 4 is a simplified table of a series of deposits in an accounting system according to an embodiment of the present invention.

DETAILED DESCRIPTION OF ILLUSTRATIVE EMBODIMENTS

Figure 1:
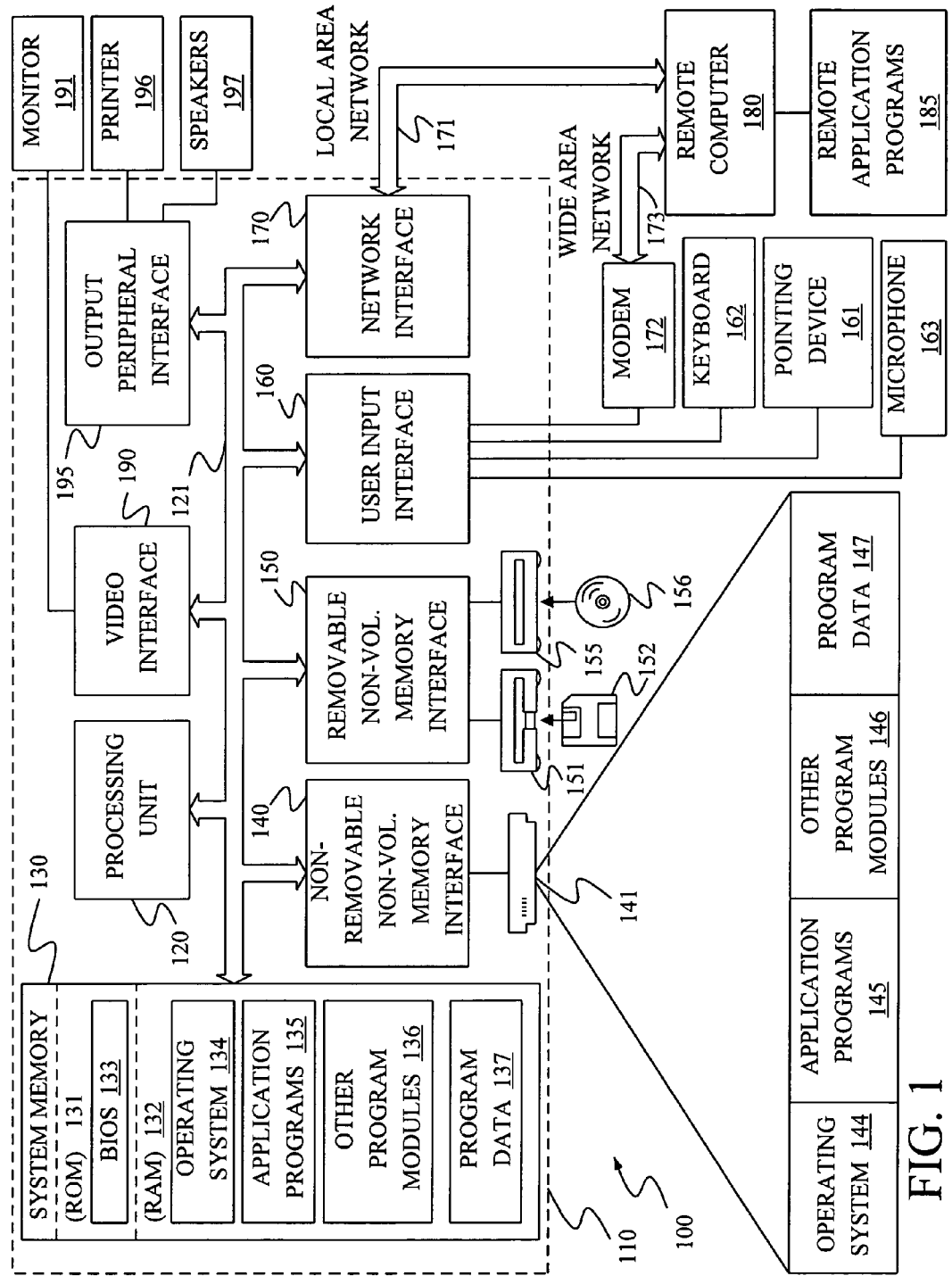
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, and the like, which perform particular tasks or which implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a feature within an enterprise accounting system for automatic generation of bank deposits. A generated bank deposit can be a summary of all data entered for a particular session per bank account. This deposit generation method can then be associated to particular cash-in transactions or to a series of cash-in transactions with a full audit trail.

Figure 2:
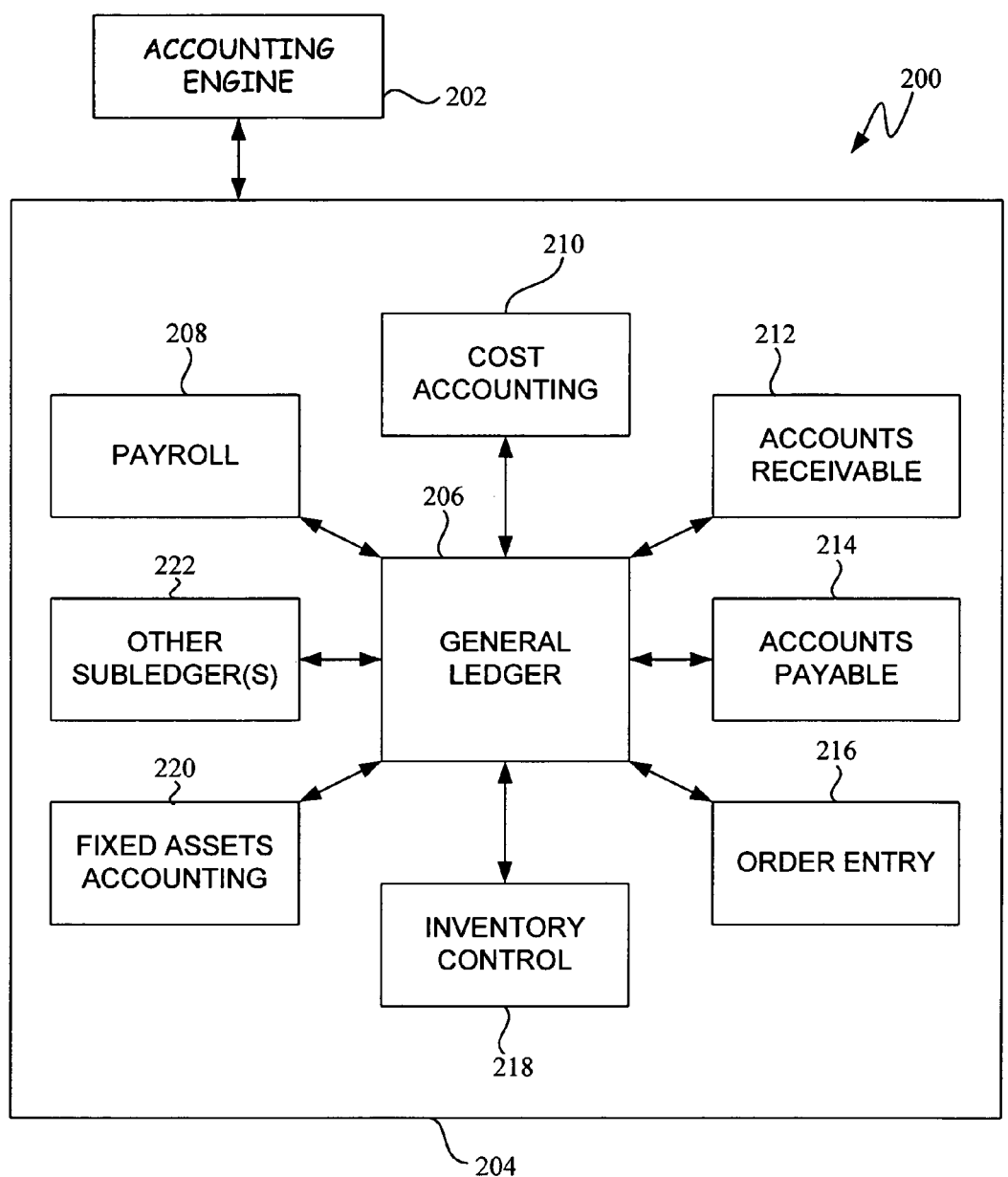
FIG. 2 is a simplified block diagram of a computer-based accounting system according to an embodiment of the present invention.

FIG. 2 is a simplified block diagram of an accounting system 200 according to an embodiment of the present invention. The accounting system 200 includes an accounting engine 202 and ledger data 204. The ledger data 204 generally includes a general ledger 206 surrounded by a series of sub-ledgers or subsidiary ledgers (208–222). The sub-ledgers can include a payroll sub-ledger 208, a cost accounting sub-ledger 210, an accounts receivable sub-ledger 212, an accounts payable sub-ledger 214, an order entry sub-ledger 216, an inventory control sub-ledger 218, a fixed-assets accounting sub-ledger 220, and other sub-ledgers 222, depending on the specific implementation.

A general ledger 206 represents the central books of an enterprise or company, and every financial transaction is posted to the general ledger 206. All entries that are entered (posted) to the sub-ledgers (208–222) transact through the general ledger 206. For example, when a credit sale posted in an accounts receivable sub-ledger 212 turns into cash due to receipt of a payment (a cash-in transaction), the cash-in transaction is posted to the general ledger 206 and to the accounts receivable sub-ledger 212. The cash-in transaction may also be posted to a cash-in sub-ledger (such as other subledger 222), depending on the specific implementation.

There may be times when items are posted directly to the general ledger 206 without any sub-ledger postings. For example, capital financial transactions that have no operational sub-ledgers may be posted to the general ledger 206. These types of postings may include items such as capital contributions, loan proceeds, loan repayments (principal), and proceeds from sales of assets. These items can be linked to the balance sheet but not necessarily to profit and loss statements. In general, the general ledger 206 provides an internal trail of transactions, so that any discrepancy (such as double-billing, unrecorded payments, and the like) can be readily identified and the origin can be traced in order to verify the accuracy of the accounting.

Each of the sub-ledgers (208–222) are ledgers containing detailed entries of the subledger. Typically, a sub-ledger summarizes the entries, then sends the summary up to the general ledger 206. For example, an accounts receivable sub-ledger 212 records all credit sales and payments received. The transactions can be summed together and posted to the general ledger 206. The value of the posting can then be adjusted within the general ledger 206. Additionally, information within the posted sub-ledger transactions can be used to increase cash and decrease inventory, thereby affecting other ledgers within the system 200.

The balance of each sub-ledger entry should exactly equal the account balance for that sub-ledger account in the general ledger 206. If it does not, there is a problem.

The accounting engine 202 can also include a user interface, reporting features, and various other functions and user options for interacting with the ledger data 204.

Figure 3:
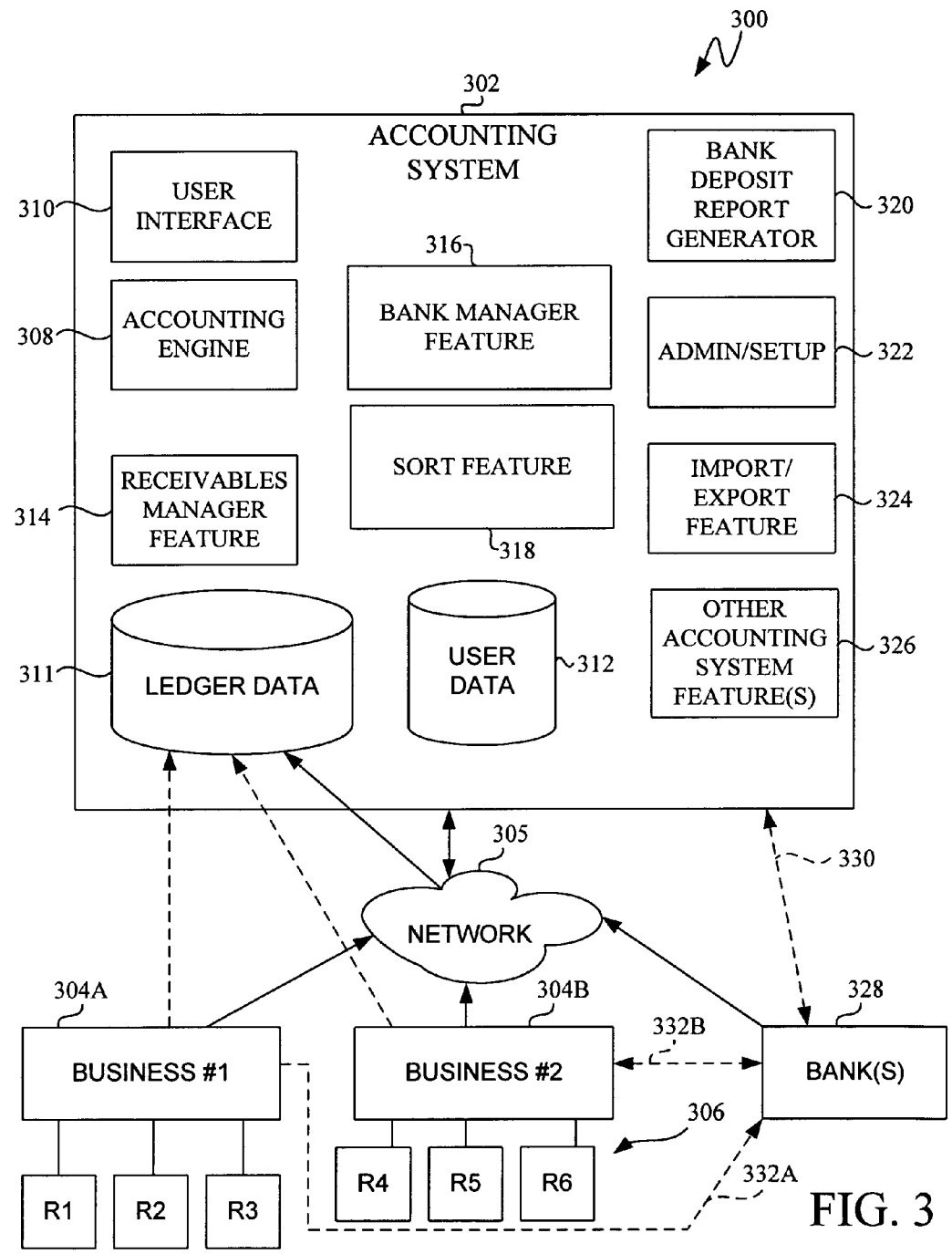
FIG. 3 is a simplified block diagram of a portion of an accounting system according to an embodiment of the present invention.

FIG. 3 is a simplified block diagram of an enterprise system 300 according to an embodiment of the present invention. The system 300 includes an accounting system 302, which can be coupled to one or more businesses, such as businesses 304A and 304B, over a network 305 or by direct connections (indicated by phantom arrows). Each of the one or more businesses 304A and 304B can include one or more inputs (such as cash registers, generally indicated by reference numeral 306 and identified by "R1", "R2", "R3", "R4", "R5", and "R6"). In this instance, the registers 306 record cash-in transactions (cash, check, debit, money order, prepaid card, credit card, and other payment types), which can be uploaded to the accounting system 302 over network 305.

The accounting system 302 can include an accounting engine 308, a user interface 310, ledger data 311, user data 312, a receivables manager 314, a bank manager feature 316, a sort feature 318, a bank deposit generator 320, an admin/setup utility 322, an import/export feature 324, and optionally other accounting system feature(s) 326. A user, such as an accountant, can access the data stored in the ledger data 311 by interacting with user interface 310. The user interface 310 can be used to manipulate the data in the ledger data 311 using the accounting engine 308. The user data 312 can include user names, associated password information, and associated access privileges to control access to the system 302. The accounting engine 308 is adapted to control access to the ledger data 311 based on the user data 312. The receivables manager feature 314 can be used by an accountant to access individual transaction lines in the ledger data 311. The bank manager feature 316 can be used by an accountant to access deposit data from a bank 328, over network 305 or by direct connection (indicated by arrow 330). The sort feature 318 can be used to sort cash-in transactions into a selected order based on one or more selectable criteria.

Cash-in transactions are recorded to the ledger data 311 over network 305 from each of the registers R1 through R6. Subsequently, each business 304A and 304B (or even a cashier for each register) deposits checks and cash (or other payment types) at one or more banks 328 (as indicated by phantom arrows 332A and 332B).

To assign cash-in transactions to the bank deposits, a user, such as an accountant, can access the bank deposit generator 320 through user interface 310, select one or more criteria, and generate one or more bank deposits. The report generator 320 automatically groups the individual cash-in transactions based on the user selectable criteria to produce bank deposits. Generally, the cash-in transactions can be grouped according to any information associated with the transaction lines that are posted to the ledger data 311. In one embodiment, the selectable criteria includes a bank account ID, a currency type, a payment method, a payment receipt status, a User ID, and a date range. The user can group cash-in transactions using the report generator based on any combination of the selectable criteria. A bank deposit is then automatically generated by the system for each unique criteria met by the cash-in transactions.

As used herein, the term "bank deposit" refers to a grouping of cash-in transactions, which match selected criteria. A bank deposit can refer to a deposit of monies in a bank institution, resulting in a deposit receipt or ticket. The accounting system generates a bank deposit based on selected criteria, resulting in a logical grouping of cash-in transactions based on the criteria within a deposit report. A corresponding association can also be created within the ledger data 311. For example, a hidden variable can be set within a cash-in transaction record to indicate that the cash-in transaction has already been associated with a deposit, so that future deposit generation events do not include the associated cash-in transaction.

FIG. 4 is a simplified tabular view of a portion of an accounts receivable ledger 400 according to an embodiment of the present invention. The ledger 400 includes a plurality of fields, including receipt number 402, bank account 404, currency type 406, payment method 408, receipt status 410, User ID 412, Date 414, and amount 416.

The receipt number 402 can be an automatically generated unique number for each cash-in transaction. The bank account 404 can be an account number or an unique identifier for each deposit account (in this instance the identifiers are "Bank_1" and "Bank_2") for which cash-in transactions may need to be grouped. Currency type 406 refers to the currency denomination, such as US dollars, Canadian dollars, Euros, and so on. The payment method 408 refers to the form of payment, such as a check, wire transfer, electronic funds transfer, money order, cash, and so on. The receipt status 410 refers to the status of the payment, such as received (cash), posted (check, wire transfer, or electronic funds transfer), released (wire transfer or electronic funds transfer), and the like. The user ID 412 refers to the user responsible for entering each cash-in transaction (in this instance, the User ID 412 is either "Arnie" or "Phyllis"). The date 414 refers to the date on which the cash-in transaction occurred. The amount 416 is the currency value of the cash-in transaction.

In general, a single deposit should have the same bank account and currency type as other cash-in transactions associated with that deposit. In other words, a single deposit should not have both Canadian and US denominations. Additionally, a single deposit is directed to only one bank account. However, deposits can include different payment methods, different statuses, and different dates, and deposits can include cash-in transactions associated with more than one user ID. Thus, cash-in transactions for Phyllis and Arnie can be associated with a single deposit, provided the monies are deposited in the same bank and are of the same currency type.

In general, cash-in transactions, which are not already assigned to a bank deposit, can be grouped for automatic assignment to a bank deposit by bank account and currency type. The cash-in transactions can be further defined and/or sorted by payment method, receipt status, User ID, date range, and the like.

Figure 5:
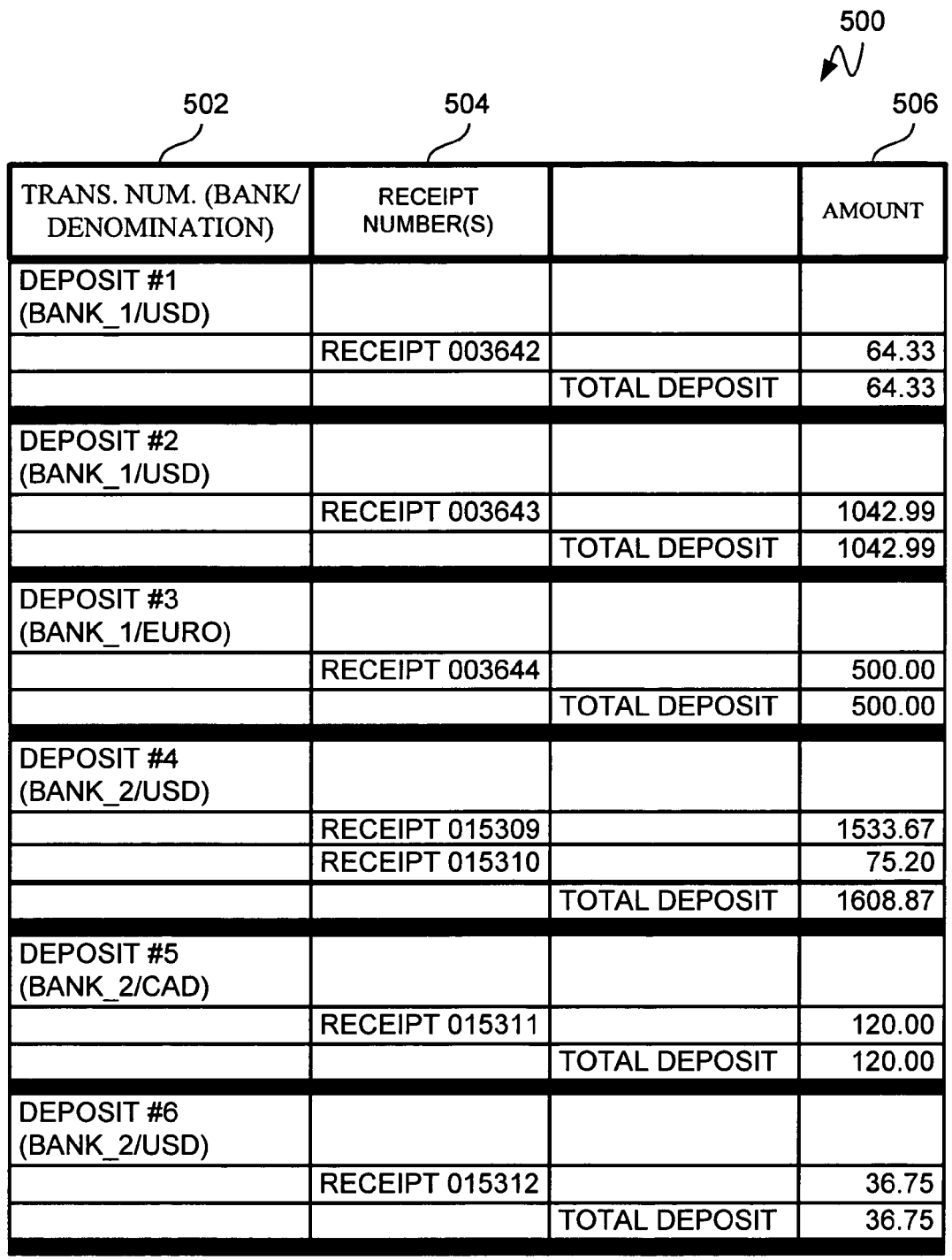
FIG. 5 is a simplified table of bank deposits with associated receipts generated from a report generator of the accounting system according an embodiment of the present invention.

FIG. 5 is a simplified report 500 of bank deposits illustrating cash-in transaction grouping according to an embodiment of the present invention. The simplified report 500 was generated using the bank deposit generator (indicated by reference numeral 320 in FIG. 3) based on selectable criteria, including bank account, currency and payment method. The report 500 includes transaction number (bank/denomination) 502, receipt number(s) 504, and itemized and total amounts 506 for each deposit grouping.

In this instance, cash-in transactions 015309 and 015310 are grouped together and associated with a single deposit because the cash-in transactions each satisfy the selected criteria (both are deposited in Bank_1, both are in US denominations, and both were paid by check). Thus, the report generator automatically grouped individual cash-in transactions from accounts receivable (for example) under a single deposit.

By permitting user selection of criteria for the bank deposit, the accounting system is adapted to generate the bank deposits for the user, quickly. Moreover, the user is empowered to generate deposits automatically based on any combination of bank account, currency type, payment method, receipt status, User ID, Date Range, amount, and so on. Other selectable criteria may include a register identifier (for example), a business identifier (such as a location ID for a large enterprise with multiple stores to differentiate between locations), and the like. In general, the report generator provides a means by which the user can access information associated with the cash-in transactions in order to simplify and accelerate the bank deposit/cash-in association process. Since the system possesses information associated with each cash-in transaction, such as who entered it, how much it was for, when it was made, the payment method, and so on, that information can be used to assist in book-keeping.

Figure 6:
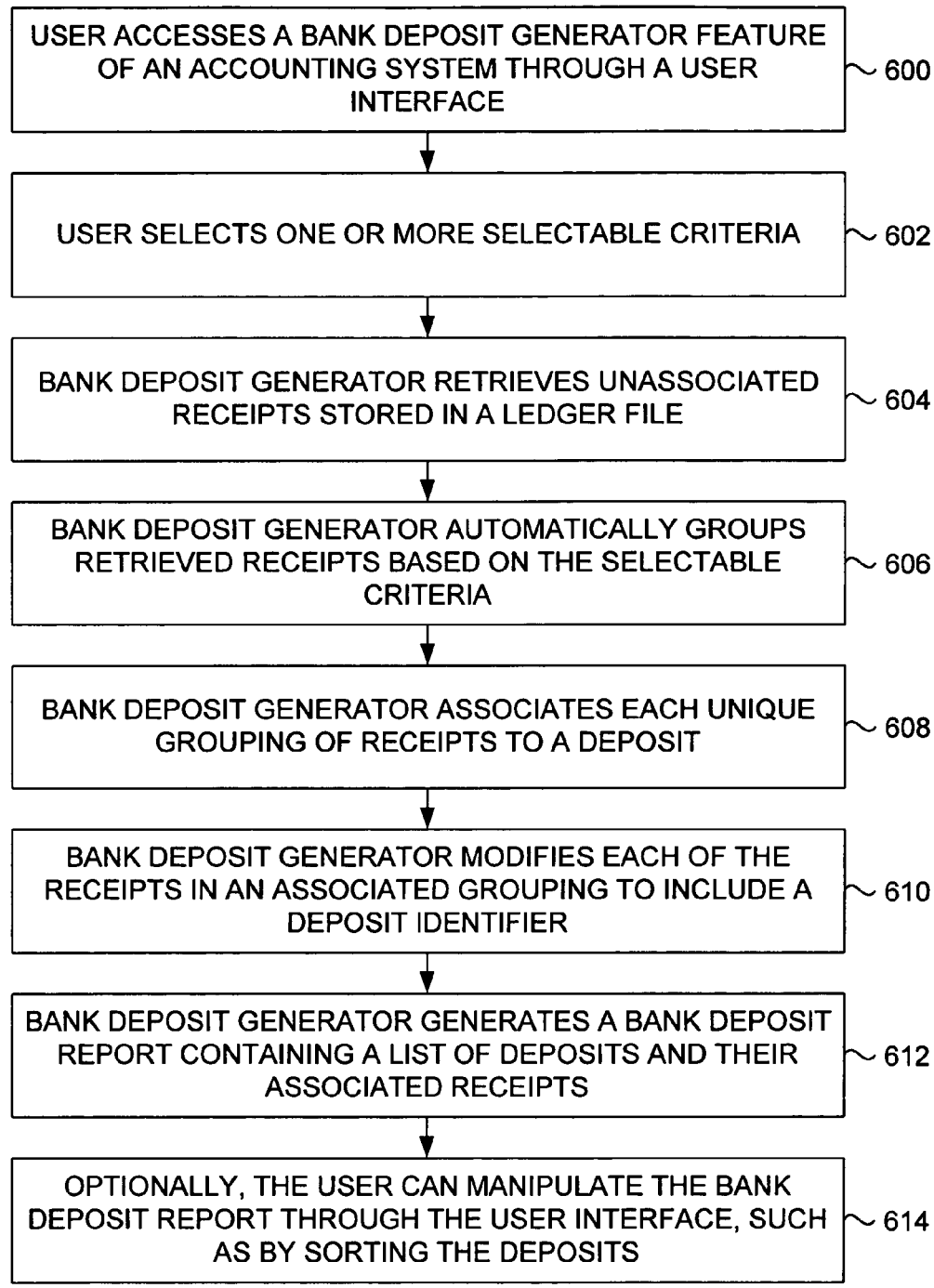
FIG. 6 is a simplified flow diagram of a process for generating a deposit report based on selectable report criteria according to an embodiment of the present invention.

FIG. 6 is a simplified flow diagram of a process for generating a bank deposit according to an embodiment of the present invention. A user accesses a bank deposit generator feature of an accounting system through a user interface (step 600). The user selects one or more selectable criteria (step 602). The bank deposit generator retrieves unassociated cash-in transactions (meaning cash-in transactions not previously associated with a bank deposit) stored in the ledger data (step 604). The bank deposit generator automatically groups cash-in transactions based on commonality within the selectable criteria (step 606). The bank deposit generator associates each unique grouping of cash-in transactions to a unique deposit (step 608). The bank deposit generator modifies each of the cash-in transactions in an associated grouping to include a deposit identifier (step 610). The deposit identifier is a flag or information field within the cash-in transaction line or record of the ledger file that provides a means for identifying the deposit to which each grouped cash-in transaction is associated. Finally, the bank deposit generator generates a bank deposit report (step 612). The bank deposit report can contain any number of bank deposits, and each bank deposit is associated with one or more of the previously unassociated cash-in transactions. Optionally, the user can manipulate the report through the user interface, such as by sorting the deposit list using a sort feature of the system (step 614).

In one embodiment, a deposit record is created in a general ledger or centralized ledger, and the associated cash-in transactions are identified within the deposit record transaction line. In another embodiment, the deposit record transaction line is a header containing information linking to the associated cash-in transactions.

In one embodiment, a deposit record transaction is tentatively stored and the cash-in transaction lines or records are not modified until a manager or accountant accepts the deposit record through, for example, a user interface. Acceptance of a generated deposit record would then cause the automatic modification of the cash-in transaction lines or records to reflect the association to a particular deposit record.

It should be understood that large numbers of cash-in transactions may be imported in a single deposit record. An embodiment of the automated bank deposit generator makes it possible to import an itemized deposit. Alternatively, the present invention provides a means by which cash-in transactions can be categorized and associated to a deposit, in order to make it easier for an accountant to balance the accounts.

While the preceding discussion was focused largely on user-generated bank deposits using the automated bank deposit generator (which can be referred to as "deposits built by query"), an enterprise or user may wish to generate deposits automatically during cash-in transaction processing with little user intervention. In this case, the accounting system can be adapted to create the deposit information as the user performs the cash-in transaction processing. The user can instruct or configure the system to generate a deposit automatically, and the system will automatically generate a deposit and associate each new cash-in transaction for a particular session with the generated deposit. In an alternative embodiment, the user can create one or more deposit records and select between available deposits during the cash-in transaction process. For example, the register at the point of sale may allow the manager or the cashier to create one or more deposits and can be adapted to prompt the cashier to select the appropriate deposit for each cash-in transaction. In this instance, cash-in transactions could be grouped by cash register, by user, by payment method, and so on.

In one embodiment, if the user decides to have deposits created automatically during cash-in transaction processing, the user can select an existing unposted deposit, which will be available during cash-in transaction processing. In another embodiment, the system can be configured to automatically generate a deposit for each cash-in transaction without user interaction, such as for cash-in transaction processing of an electronic funds transfer (EFT) from an EFT system.

Finally, though the above discussion is directed to bank deposit generation based on cash-in transactions, it should be understood that the system and methods of the present invention can be applied to any grouping of financial transactions into a single transaction, such as a transfer transaction. For example, rather than a deposit record, the present invention can be used to generate a financial transfer record corresponding to the transfer of one or more assets between the sub-ledgers.

Although the present invention has been described with reference to particular embodiments, workers skilled in the art will recognize that changes may be made in form and detail without departing from the spirit and scope of the invention.

What is claimed is:

1. An enterprise accounting system comprising:
   a connection connectable to at least one bank to permit the enterprise accounting system to access deposit data at the at least one bank;
   a data file containing a plurality of financial transactions for access by an enterprise accounting system user, each financial transaction having associated information, and a first one of the financial transactions being associated with multiple tallied receipts; and
   a bank deposit generator adapted to identify one or more cash-in transactions of the plurality of financial transactions according to selectable criteria, and a first one of the cash-in transactions including the multiple tallied receipts and to associate the first one of the cash-in transactions to a bank deposit transaction that includes the first one of the financial transactions based on a correlation between the associated information and the selectable criteria.

2. The enterprise accounting system of claim 1 further comprising:
   a user interface coupled to the bank deposit generator and adapted for user interaction with the selectable criteria.

3. The enterprise accounting system of claim 1 wherein the bank deposit generator is adapted to modify the associated first one of the cash-in transactions to include a deposit identifier that identifies the bank deposit transaction.

4. The enterprise accounting system of claim 1 wherein the selectable criteria comprises a bank account, a currency, and a payment method.

5. The enterprise accounting system of claim 1 wherein the selectable criteria comprises a bank account, a currency and a receipt status.

6. The enterprise accounting system of claim 1 further comprising:
   a sort feature adapted sort the one or more cash-in transactions according to the selectable criteria.

7. A method for generating a bank deposit in an enterprise accounting system, the method comprising:
   accessing deposit data from at least one bank through a connection in the enterprise accounting system that is connectable to the at least one bank;
   identifying cash-in transactions within a financial transactions data file for access by an enterprise accounting system user, the identifying being based on one or more selectable criteria, the cash-in transactions including a first cash-in transaction that includes multiple tallied receipts;
   associating the identified cash-in transactions to a deposit record that includes a first deposit record that includes the multiple tallied receipts; and
   updating the first cash-in transaction within the data file with a deposit identifier associated with the deposit record of the first deposit.

8. The method of claim 7 wherein before the step of identifying, the method further comprising:
   selecting at least one of the one or more selectable criteria for searching the financial transactions data file for unassociated cash-in transactions.

9. The method of claim 7 wherein the financial transactions data file comprises monetary transactions and associated information.

10. The method of claim 7 further comprising:
    generating a deposit report comprising one or more deposit records.

11. The method of claim 7 wherein the selectable criteria comprises a bank account and a currency.

12. The method of claim 7 wherein the step of associating comprises:
    generating a new deposit record for the identified cash-in transactions; and
    associating the identified cash-in transactions to the new deposit record.

13. An enterprise accounting system comprising:
    a connection in the enterprise accounting system that is connectable to at least one bank to access deposit data in the at least one bank;
    a data file of cash-in transactions and associated information for access by an enterprise accounting system user, the cash-in transactions including a first cash-in transaction that includes multiple tallied receipts; and
    a bank deposit generator adapted to assign cash-in transactions to a bank deposit that includes the multiple tallied receipts based on a correlation between the associated information and selectable criteria.

14. The enterprise accounting system of claim 13 and further comprising:
    a user interface adapted for user interaction with the selectable criteria.

15. The enterprise accounting system of claim 14 wherein the user interface allows selection of any combination of the selectable criteria.

16. The enterprise accounting system of claim 13 wherein the bank deposit generator is adapted to insert a deposit identifier associated with the bank deposit into each assigned cash-in transaction within the data file.

17. The enterprise accounting system of claim 13 wherein the bank deposit is stored as a bank deposit record, the enterprise accounting system further comprising:

a bank manager feature coupled to the bank deposit generator and adapted to provide user access to the stored bank deposit record.

18. The enterprise accounting system of claim 13 further comprising:
a user data file for storing usernames and associated passwords and access permissions.

19. The enterprise accounting system of claim 18 further comprising:

an accounting engine adapted to control access to the data file based on the user data file.

20. The enterprise accounting system of claim 13 wherein each cash-in transaction can be associated to only one deposit record.

* * * * *